(12) United States Patent
Dijoux et al.

(10) Patent No.: US 10,447,629 B2
(45) Date of Patent: Oct. 15, 2019

(54) METHOD OF CONSTRUCTING A MESSAGE BY MEANS OF A TERMINAL

(71) Applicant: Orange, Paris (FR)

(72) Inventors: Geneviève Dijoux, Paris (FR); Cyrielle Lemaitre, Nanterre (FR); Halim Bendiabdallah, Vaucresson (FR)

(73) Assignee: ORANGE, Paris (FR)

( * ) Notice: Subject to any disclaimer, the term of this patent is extended or adjusted under 35 U.S.C. 154(b) by 193 days.

(21) Appl. No.: 14/673,661

(22) Filed: Mar. 30, 2015

(65) Prior Publication Data

US 2015/0281152 A1 Oct. 1, 2015

(30) Foreign Application Priority Data

Mar. 31, 2014 (FR) ...................... 14 52846

(51) Int. Cl.
*H04L 12/58* (2006.01)
*G06F 3/0484* (2013.01)
*H04L 29/06* (2006.01)

(52) U.S. Cl.
CPC .......... *H04L 51/10* (2013.01); *G06F 3/04842* (2013.01); *G06F 3/04847* (2013.01); *H04L 51/18* (2013.01); *H04L 67/38* (2013.01)

(58) Field of Classification Search
CPC ... H04L 51/10; H04L 51/18; H04L 29/06034; G06F 3/04842; G06F 3/04847
See application file for complete search history.

(56) References Cited

U.S. PATENT DOCUMENTS 7,689,700 B2 * 3/2010 McNeil ................. H04L 67/104
  709/229
8,196,198 B1 * 6/2012 Eger ...................... G06F 21/36
  726/2

(Continued)

FOREIGN PATENT DOCUMENTS

GB 2 359 640 A 8/2001
WO WO 02/087267 A1 10/2002

OTHER PUBLICATIONS

French Preliminary Search Report dated Dec. 4, 2014 for FR 1452846 filed Mar. 31, 2014, 1 page.

*Primary Examiner* — Blake J Rubin
(74) *Attorney, Agent, or Firm* — Knobbe, Martens, Olson & Bear, LLP

(57) ABSTRACT

One embodiment comprises obtaining an identification of at least one multimedia content and at least one destination user; constructing a message by a challenge definition module installed on a terminal on the basis of at least one interaction with a sender user. The construction may comprise (a) producing metadata defining, in association with the multimedia content, both a challenge for presenting to the destination user and also an expected response to the challenge, the metadata combining the information required for executing the challenge on at least one terminal of the destination user; (b) inserting the metadata and an identifier in the message, the identifier identifying the terminal of the destination user of the message; and (c) using a telecommunications network to send the message and data giving access to the multimedia content to a server for relaying the metadata and the multimedia content to the terminal of the destination user.

23 Claims, 6 Drawing Sheets

(56) References Cited

U.S. PATENT DOCUMENTS

| | | | | |
|---|---|---|---|---|
| 8,315,595 B2* | 11/2012 | Murphy | H04L 63/12 | 455/410 |
| 8,402,548 B1* | 3/2013 | Muriello | G06F 21/60 | 726/26 |
| 8,510,795 B1* | 8/2013 | Gargi | G09B 5/06 | 382/276 |
| 8,925,057 B1* | 12/2014 | Ansari | G06F 21/31 | 382/181 |
| 8,984,292 B2* | 3/2015 | Lind | G06F 21/316 | 713/182 |
| 9,131,374 B1* | 9/2015 | Avni | H04W 12/06 | |
| 9,252,959 B2* | 2/2016 | Barriga | H04L 9/3271 | |
| 9,258,306 B2* | 2/2016 | Saxena | H04L 63/102 | |
| 9,563,763 B1* | 2/2017 | Roth | G06F 21/36 | |
| 9,641,537 B2* | 5/2017 | Cohen | G06F 21/10 | |
| 2004/0002382 A1* | 1/2004 | Ho | H04M 1/72544 | 463/41 |
| 2007/0006327 A1* | 1/2007 | Lal | G06Q 20/123 | 726/31 |
| 2008/0189768 A1* | 8/2008 | Callahan | H04L 63/105 | 726/4 |
| 2009/0044264 A1* | 2/2009 | Ramanathan | G06F 21/552 | 726/14 |
| 2009/0083826 A1* | 3/2009 | Baribault | H04L 51/12 | 726/1 |
| 2009/0163272 A1* | 6/2009 | Baker | A63F 13/12 | 463/29 |
| 2009/0183263 A1* | 7/2009 | McMichael | G06F 21/125 | 726/27 |
| 2009/0204819 A1* | 8/2009 | Parker | G06F 21/36 | 713/182 |
| 2009/0217368 A1* | 8/2009 | Buss | G06F 21/34 | 726/9 |
| 2009/0260068 A1* | 10/2009 | Hariharan | H04L 9/32 | 726/7 |
| 2009/0288150 A1* | 11/2009 | Toomim | G06F 21/6218 | 726/5 |
| 2009/0325661 A1* | 12/2009 | Gross | A63F 13/12 | 463/9 |
| 2009/0328150 A1* | 12/2009 | Gross | A63F 13/12 | 726/3 |
| 2009/0328175 A1* | 12/2009 | Shuster | G06F 21/36 | 726/7 |
| 2010/0031287 A1* | 2/2010 | Simon | G06Q 30/02 | 725/38 |
| 2010/0031330 A1* | 2/2010 | Von Ahn | G06F 21/36 | 726/5 |
| 2010/0058376 A1* | 3/2010 | Alhadeff | H04H 60/31 | 725/10 |
| 2010/0081120 A1* | 4/2010 | Nanjiani | H04L 29/06034 | 434/322 |
| 2010/0180333 A1* | 7/2010 | Bono | H04L 12/585 | 726/13 |
| 2010/0212018 A1* | 8/2010 | Rangarajan | G06F 21/316 | 726/26 |
| 2010/0229223 A1* | 9/2010 | Shepard | G06F 21/31 | 726/5 |
| 2011/0113378 A1* | 5/2011 | Boden | G06F 21/36 | 715/837 |
| 2011/0191820 A1* | 8/2011 | Ivey | G06F 16/00 | 726/3 |
| 2011/0281638 A1* | 11/2011 | Bansi | A63F 13/795 | 463/23 |
| 2011/0314540 A1* | 12/2011 | Poluri | G06F 21/31 | 726/21 |
| 2012/0167169 A1* | 6/2012 | Ge | H04L 9/321 | 726/2 |
| 2012/0246737 A1* | 9/2012 | Paxton | G06F 21/316 | 726/27 |
| 2013/0019286 A1* | 1/2013 | Barborak | G06F 17/27 | 726/4 |
| 2013/0036342 A1* | 2/2013 | Deo | G06Q 30/02 | 715/202 |
| 2013/0160095 A1* | 6/2013 | Seleznyov | G06F 21/36 | 726/5 |
| 2013/0165237 A1* | 6/2013 | Park | A63F 13/211 | 463/42 |
| 2013/0217501 A1* | 8/2013 | Bruno, Jr. | A63F 13/795 | 463/42 |
| 2013/0244784 A1* | 9/2013 | Assa | G06F 3/0488 | 463/40 |
| 2013/0263230 A1* | 10/2013 | Gorodyansky | H04L 63/083 | 726/4 |
| 2014/0012652 A1* | 1/2014 | Levin | G06Q 30/0233 | 705/14.31 |
| 2014/0026048 A1* | 1/2014 | Spirer | G06F 3/0484 | 715/716 |
| 2014/0039892 A1* | 2/2014 | Mills | G06F 21/32 | 704/246 |
| 2014/0059663 A1* | 2/2014 | Rajshekar | H04L 63/08 | 726/6 |
| 2014/0096215 A1* | 4/2014 | Hessler | H04L 63/0869 | 726/7 |
| 2014/0187314 A1* | 7/2014 | Perry | A63F 13/10 | 463/29 |
| 2014/0280936 A1* | 9/2014 | Nandagopal | H04L 67/22 | 709/225 |
| 2014/0304654 A1* | 10/2014 | Gross | G06F 3/0482 | 715/811 |
| 2014/0344672 A1* | 11/2014 | Kapoor | G09B 7/00 | 715/235 |
| 2015/0045104 A1* | 2/2015 | Leslie | G07F 17/34 | 463/20 |
| 2015/0143495 A1* | 5/2015 | Okada | H04L 63/08 | 726/7 |
| 2016/0048662 A1* | 2/2016 | Arnoud | G06F 21/31 | 726/5 |
| 2016/0065559 A1* | 3/2016 | Archer | H04L 63/083 | 726/8 |

* cited by examiner

METHOD OF CONSTRUCTING A MESSAGE BY MEANS OF A TERMINAL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

RELATED APPLICATIONS

This application claims priority to French Application No. 1452846, filed Mar. 31, 2014, the disclosure of which is incorporated herein by reference in its entirety.

BACKGROUND OF THE INVENTION

One embodiment provided herein relates to the general field of software applications.

Another embodiment provided herein relates more particularly to a mechanism for enriching the functions of a software application of an entertaining nature installed on a user's terminal, and in particular on a mobile terminal such as, for example, a smart phone, a digital tablet, etc.

Nowadays, users have a passion for electronic or video games, and more particularly for games that users can install on their mobile terminals.

These games installed on user terminals are generally of an individual nature, i.e. they propose challenges for one player only (i.e. the user of the terminal) and they do not enable a plurality of users to communicate or interact directly with one another.

Certain games have a function enabling them to publish the scores reached by users on a web server or on a social network server so as to share the score with other users. Nevertheless, interactions between users remain limited.

The inventors have thus observed that at present there does not exist in the state of the art any method enabling a game that provides a challenge (i.e. a software application or program that is fun to play with) that can be associated on terminals, and in particular on mobile terminals, with a communications service or with software enabling users to communicate with other users, e.g. by message.

SUMMARY OF THE INVENTION

One embodiment provided herein proposes a mechanism that uses the technical principles of a game (by producing a challenge and presenting the challenge to a destination user) to offer a new mode of interaction between two or more users for playing such games, by taking advantage of the existence of message communications services available in a telecommunications network, such as in a mobile telecommunications network, in particular.

This mechanism relies on three distinct entities and on the methods implemented by those entities, namely: a terminal of a user sending a message having inserted therein data for defining a challenge, whereby the sending user can share multimedia content with another user referred to as a "destination" user; the terminal of the destination user, which is suitable for presenting (i.e. for executing) the challenge proposed by the sender user to the destination user; and a server arranged in series between the terminal of the sender user and the terminal of the destination user (i.e. the message passes through the server) and that is suitable for supplying the multimedia content to the terminal of the destination user.

The term "multimedia content" is used herein to mean any type of digital content, such as for example audio or video content, text, or indeed an image.

More specifically, in a first aspect, provided herein is a construction method for constructing a message by means of a terminal, the method comprising:

an obtaining process of obtaining an identification of at least one multimedia content and of at least one destination user;

a construction process of constructing a message by a challenge definition module installed on the terminal, the message being constructed on the basis of at least one interaction with a sender user, the construction process comprising:

a production process of producing metadata defining, in association with said at least one multimedia content, both a challenge for presenting to said at least one destination user and also an expected response to the challenge; and an insertion process of inserting the metadata and an identifier in the message, the identifier serving to identify at least one terminal of said at least one destination user of the message; and a sending process of the terminal using a telecommunications network to send the message and data giving access to said at least one multimedia content to a server suitable for relaying the metadata and said at least one multimedia content to a said terminal of said at least one destination user.

Correspondingly, provided herein is a terminal of a message sender user, the terminal comprising:

a module for selecting at least one multimedia content and at least one destination user;

a challenge definition module suitable for constructing said message on the basis of at least one interaction with a sender user, the challenge definition module being suitable for:

producing metadata defining, in association with said at least one multimedia content, both a challenge for presenting to said at least one destination user and also an expected response to the challenge; and inserting in the message the metadata and an identifier serving to identify said at least one terminal of said at least one destination user; and a module for sending the message and the access data to said at least one multimedia content via a telecommunications network to a server suitable for relaying the metadata and said at least one multimedia content to a said terminal of said at least one destination user.

The term "access data to multimedia content" is used herein to mean either the multimedia content itself, or else data, e.g. such as an address or a uniform resource locator (URL) making it possible to access the multimedia content on an entity that may be local or remote.

One embodiment provided herein seeks to enrich the possibilities for interaction between a plurality of users by means of games in the form of challenges. Implementation of some embodiments provided herein makes use of a challenge definition module on the terminal of the sender of the message, this challenge definition module being capable of generating metadata defining a challenge and of transmitting the metadata to a destination user for processing and decoding the metadata of the challenge by means of a corresponding module—referred to as a challenge presentation module—that is executed on the terminal of the destination user.

The challenge as created in this way is for accompanying a multimedia content selected by the sender user for the destination user, thereby making access to this content by the destination user a playful experience. In this context, the user may in particular select multimedia contents that are of no urgency or importance.

The term "metadata defining, in association with a multimedia content, a challenge for presenting to a destination user" is used herein to mean that the metadata defines a challenge governing whether or not the multimedia content is supplied to the destination user. The challenge may for example determine whether or not the multimedia content is properly speaking played back (i.e. presented) to the destination user, or it may propose partial playback of the multimedia content or playback of a transformed version of the multimedia content (e.g. as a result of truncating, scrambling, or masking certain portions of the content), with the multimedia content in full being supplied to the destination user in the event of the destination user successfully solving the challenge. The challenge defined by the metadata may be independent of the multimedia content (e.g. an arbitrary question, a riddle), or it may be defined on the basis of that content (e.g. jigsaw puzzle made from multimedia content and that is to be reconstructed, a truncated image of the multimedia content that is to be guessed, etc.).

The metadata of a challenge is data defining the challenge that defines (i.e. describes) explicitly or in coded manner at least one challenge and the expected response to that challenge. The data may be alphanumeric (i.e. of text type), preferably complying with coding logic that is common to the challenge definition module and to the challenge presentation module installed on the terminal of said at least one destination user, so as to limit the amount of information that needs to be transmitted to the terminal of the destination user in order to enable the challenge to be executed.

In other words, the metadata comprises the information needed to execute the challenge by the challenge presentation module installed on the terminal of said at least one destination user for the message.

In particular, the metadata may comprise the type of challenge proposed by the sender user, parameters of that challenge, such as for example questions to be asked during presentation (i.e. during execution) of the challenge for a challenge of the quiz or multiple choice question type, the expected response to the challenge, the positions of jigsaw puzzle pieces for a jigsaw puzzle type challenge, etc.

The metadata may also include a maximum duration for providing a response to the challenge after the challenge has been presented to a said destination user. This characteristic serves to add an additional game-playing dimension to the challenge proposed by the sender user to the destination user of the message.

The metadata may also be used to identify at least one operation to be executed after the challenge has been presented by the challenge presentation module installed on the terminal of the destination user, depending on whether a response provided by said at least one destination user does or does not correspond to the expected response.

Depending on the intended type of challenge, the metadata may also include information about the nature of said at least one multimedia content, thus enabling the challenge presentation module installed on the terminal of the destination user to make use of a playback module that is appropriate to the multimedia content.

One embodiment provided herein thus proposes a playful alternative to present communications services such as the short messaging service (SMS) or the multimedia messaging service (MMS). It advantageously extends the capacities of presently existing services on mobile communications networks by proposing a novel experience for users, while still being compatible with those services.

One embodiment provided herein thus enables the users of terminals to create their own challenges using their terminals, e.g. by means of a user interface provided for that purpose. A challenge may consist in hiding a multimedia content in the challenge as created in this way, and in presenting the challenge and the multimedia content hidden in the challenge to a selected destination user. Successfully solving the challenge (in other words providing the expected response to the challenge, which is also included in the metadata of the challenge) then enables the destination user of the message to access the multimedia content that was sent by the sender user. User experience during communication is thus enriched, with interactions between users becoming playful as a result.

Various types of challenge can easily be produced by the sender user using a terminal, such as for example:
  jigsaw puzzle devised on the basis of the multimedia content selected by the user;
  blind tests, quiz type tests, or multiple choice questions optionally in association with the multimedia content;
  mystery photographs, or more generally mystery multimedia content presenting the destination user with the multimedia content that has been selected by the sender user after it has been subjected to a transformation (e.g. truncating, scrambling, or masking certain portions of the content); and
  etc.

Preferably, the challenges are selected so as to be quick and simple to carry out by the destination user of the message.

In a particular implementation, the challenge may be selected by the sender user from a catalog of predetermined challenges, the catalog being adapted to said at least one destination user of the message.

The catalog of challenges may be updated with at least one new challenge selected for said at least one destination user after receiving a message from the server. The message may for example inform the sender user about the success or failure of the destination user in solving the challenge as sent.

The sender user can thus personalize the message.

In a second aspect, one embodiment provided herein also provides a reception method of a terminal receiving a message coming from a server via a telecommunications network, the message comprising metadata defining, in association with at least one multimedia content, both a challenge for presenting to a user of the terminal and also an expected response to the challenge, together with access data giving access to said at least one multimedia content on the server, the reception method comprising:
  a downloading process of downloading said at least one multimedia content on the basis of the access data; and
  a challenge presentation process of a challenge presentation module installed on the terminal presenting the challenge defined by the metadata, this presentation process comprising:
    a presentation process of presenting at least one user interface page with the challenge to the user of the terminal;

an obtaining process of obtaining a response to the challenge as made by the user;

a verification process of verifying whether the response obtained from the user matches the expected response to the challenge as defined in the metadata; and an execution process of executing at least one predetermined operation depending on whether the response obtained from the user does or does not correspond to the expected response to the challenge.

In corresponding manner, also provided herein is a terminal of a "destination" user, the terminal comprising:

a module for receiving a message coming from a server via a telecommunications network, the message comprising access data to at least one multimedia content on the server together with metadata, said metadata defining, in association with said at least one multimedia content, both a challenge for presenting to the destination user, and also an expected response to the challenge;

a module for downloading said at least one multimedia content from the access data; and a challenge presentation module suitable for analyzing and interpreting the metadata in order to:

present at least one user interface page with the challenge to the destination user;

obtain a response to the challenge from the destination user;

verify whether the response obtained from the destination user matches the expected response to the challenge as defined in the metadata; and execute at least one predetermined operation depending on whether the response obtained from the destination user does or does not correspond to the expected response to the challenge.

Thus, in accordance with some embodiments provided herein, the challenge presentation module installed on the terminal of the destination user is suitable for analyzing and interpreting the received challenge metadata in order to:

present the destination user with at least one user interface page with a challenge that requires a response, by combining a user interface page template with the metadata and optionally (depending on the type of challenge in consideration) with the multimedia content defined by the sender user;

obtain the response provided by the destination user and determine whether the response that has been given is right or wrong; and trigger at least one predetermined operation depending on whether the response is right or wrong.

By way of example, the predetermined operation performed after receiving and analyzing the response from the destination user may comprise:

displaying another user interface page, this other page possibly indicating in particular whether the right response was or was not found by the destination user (in other words whether the response provided by the destination user does or does not correspond to the expected response included in the metadata); or playing back said at least one multimedia content.

Thus, in accordance with some embodiments provided herein, when a challenge is presented by the terminal of the destination user, a succession of user interface pages is presented to the destination user.

The layout of one of these user interface pages used for presenting a challenge is preferably predefined on the basis of a user interface model or "template". Each user interface page comprises a plurality of elements contributing to presenting the challenge to the destination user (such as for example, for a quiz type challenge, a list proposing a selection of different responses including the expected response to the challenge, etc.). The arrangement and the size of these elements appearing in each user interface page, and also the succession of different pages are predefined for a given type of challenge, such that only the element that is to be presented at a location selected on a page for that element needs to be specified by the sender user in order to enable the challenge to be presented to the destination user in a form that is understandable and usable. Thus, only a few parameters of the challenge (including the elements for displaying on the user interface pages) and one or more multimedia contents need to be transmitted by message from one terminal to the other in order to implement a challenge, and not complete user interface pages.

The above-mentioned type of challenge and the parameters of the challenge are advantageously described in the metadata of a challenge, which metadata is transmitted from one terminal to the other. Since there is no need to transmit complete user interface pages, the quantity of information for transmission from the sender user terminal to the destination user terminal is small.

On receiving the metadata of a challenge, the user interface page template(s) associated with the type of challenge identified in the metadata is/are then used by the challenge presentation module of the terminal of the destination user as modified by the metadata of the challenge so as to generate one or more user interface pages for presentation when presenting the challenge.

As mentioned above, in a particular implementation, the metadata of the challenge is alphanumeric data in compliance with coding logic common to the challenge definition module of the terminal of the sender user and to the challenge presentation module of the terminal of the destination user.

By way of example, an alphanumeric code occupying one or two bytes may be used to code the type of challenge and the procedure associated with that type of challenge, i.e. an associated succession of user interface pages. As a result, the quantity of information for transmission from one user terminal to another is small.

In a third aspect, also provided herein is a processing method for implementation by a server, the method comprising:

a reception process of receiving via a telecommunications network a message and first access data to at least one multimedia content from a terminal of a sender user, the message comprising an identifier for identifying at least one terminal of at least one destination user and metadata defining, in association with said at least one multimedia content, both a challenge for presenting to said at least one destination user and also an expected response to the challenge;

a storage process of storing said at least one multimedia content in a storage space of the server; and a sending process of sending a message to a said terminal of said at least one destination user, the message comprising the metadata and second access data to said at least one multimedia content stored on the server.

Correspondingly, also provided herein is a server comprising:

a reception module suitable for receiving via a telecommunications network and from a terminal of a sender user:

first access data to at least one multimedia content; and a message comprising an identifier serving to identify at least one terminal of at least one destination user and metadata produced by the terminal of the sender user, said metadata defining, in association with said at least one multimedia content, both a challenge to be presented to said at least one destination user and also an expected response to the challenge;

a storage module suitable for storing said at least one multimedia content in a storage space of the server; and a module for sending to a said terminal of said at least one destination user a message comprising the metadata and second access data to said at least one multimedia content stored on the server.

The server thus acts as a proxy between the terminal of the sender user of the message and the terminal of the destination user. It advantageously stores the multimedia content(s) selected by the sender user for the destination user so as to limit the quantity of data sent to the terminal of the destination user. The multimedia content may thus be downloaded by the terminal of the destination user only once the destination user is about to accept the challenge that has been proposed, immediately before executing the challenge.

It should be observed that from the point of view of the sender user originating the message, the presence of the server is transparent. The sender user continues to select the destination for a message in the same manner as for any other message sent from the terminal (such as for example a message complying with the mobile telephony standard).

In a particular implementation, said at least one multimedia content is transmitted to the server in the message containing the metadata. By way of example, the message may be a hypertext transfer protocol (HTTP) request of the POST type, which is itself known. This "combined" transmission facilitates processing by the server of the data sent by the sender terminal (metadata and multimedia content(s)).

In another implementation, said at least one multimedia content is transmitted to the server in a message that is distinct from the message containing the metadata. By way of example, the metadata may be transmitted in a GET type HTTP request while the multimedia content(s) is/are transmitted in a POST type HTTP request using as a parameter an identifier supplied by the server so as to enable it to associate the metadata received in the GET type request with the multimedia content(s) received in the POST type request.

In a variant, the metadata and/or the multimedia content may be sent in some other message format, such as in particular an SMS message or an MMS message, a message format accepted in a communications suite, such as for example an enriched communications suite RICH or "Joyn®", a message format accepted by a social network, such as for example "Facebook®", etc.

In a particular implementation, the processing method comprises:

a verification process of verifying that the terminal of said at least one destination user of the message is provided with a challenge presentation module suitable for presenting the challenge defined by the metadata;

and if the terminal of said at least one destination user is not provided with the challenge presentation module, a sending process of sending an invitation message inviting the terminal to install the challenge presentation module;

the message comprising the metadata being sent to the terminal once the definition presentation module has been installed thereon.

This implementation advantageously accommodates the fact that not all terminals are necessarily ready to interpret and process the metadata sent by the sender terminal and execute the challenge defined in the metadata. For this purpose, it proposes putting a server in series between the terminals of the sender and destination users, which server performs verification to make sure that the terminal of the destination user is indeed capable of presenting to the destination user the challenge constructed by the sender user, and if not, it sends a message to the destination terminal enabling it to install a challenge presentation module capable of interpreting the metadata sent by message from the terminal of the sender user.

In a particular implementation, the construction method comprises a prior process of registering the terminal of the sender user with the server as a user of a challenge definition module and/or a challenge presentation module.

This prior registration process serves to facilitate processing the messages sent by the terminal of the sender user to the server. It enables the server to identify more quickly terminals that are compatible with the embodiments provided herein, in other words terminals that have a challenge definition module and a challenge presentation module as described herein. Thus, by way of example, the verification process can then be limited to verifying that said at least one destination user for the multimedia content sent by the terminal of the sender user is registered with the server.

Furthermore, this enables the server to anticipate verification of terminals compatible with the embodiments described herein, with this being done as from registration of the terminal.

In a particular implementation, the registration process may comprise supplying the server with a list of contacts of the sender user as stored in the terminal and having a terminal identifier associated with the identifier of the destination user.

The sender user thus does not need to specify a terminal identifier when preparing a message in order to specify the destination user, but can use any type of identifier providing that identifier is associated in the list of contacts with a terminal identifier. This makes preparing a message more user friendly for the sender user.

In a particular implementation of the processing method, the invitation message is sent to the second terminal via a mobile telecommunications network. By way of example, it may be a short message of the SMS type.

Some embodiments described herein thus have a preferred but non-limiting application to terminals that are mobile terminals. In addition, it applies advantageously to the communications media that already exist for such terminals, and specifically in this example an SMS.

In a particular implementation, the processing method performed by the server comprises a reception process of receiving a message from the terminal of a said destination user and reporting success or failure of said destination user in providing the expected response to the challenge when the challenge is presented by the terminal.

This message advantageously enables the server to maintain scores for users so as to reward them and encourage them to solve the challenges that are sent to them. Thus, by way of example, the processing method performed by the server may include an updating process of updating a score associated with said at least one destination user as a function of the failure or success reported in the message received from the terminal of the destination user.

In addition to rewarding users, the scores kept up to date by the server can be used for proposing new challenges to users, or for adapting the challenges that are proposed to them, as mentioned above.

In a variant, a score may also be given to each sender user of a message that is constructed in accordance with the embodiments described herein in order to reward the most active users.

In a variant, the message sent by the terminal of the destination user may enable the server to unblock the multimedia content present in the message constructed in accordance with the embodiments described herein in the event of that terminal reporting a failure, and providing the sender user has given agreement.

In a particular implementation, the processing method performed by the server includes, after the updating process:
- a classification process of classifying said at least one destination user as a function of that user's score relative to the scores of a plurality of users registered with the server; and
- a sending process of sending the classification to the terminal of said at least one destination user and/or to the terminal of the sender user.

In a particular implementation, the various processes of the message construction method and/or the processing method and/or the reception methods provided herein are determined by computer program instructions.

Consequently, some embodiments also provide a computer program on a data medium, the program being suitable for being performed in a terminal or more generally in a computer, the program including instructions adapted to performing processes of a message construction method as described above.

Also provided is a computer program on a data medium, the program being suitable for being performed in a terminal or more generally in a computer, the program including instructions adapted to performing processes of a processing method as described above.

Also provided is a computer program on a data medium, the program being suitable for being performed in a terminal or more generally in a computer, the program including instructions adapted to performing processes of a reception method as described above.

Each of these programs may use any programming language, and may be in the form of source code, object code, or code intermediate between source code and object code, such as in a partially compiled form, or in any other desirable form.

Also provided is a computer readable data medium including instructions of a computer program as mentioned above.

The data medium may be any entity or device capable of storing the program. For example, the medium may comprise storage means such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. In some embodiments, the program may in particular be downloaded from an Internet type network.

Alternatively, the data medium may be an integrated circuit in which the program is incorporated, the circuit being adapted to execute or to be used in the execution of the method in question.

In another aspect, provided herein is a system comprising:
- a terminal of a "sender" user of as provided herein;
- at least one terminal of at least one "destination" user as provided herein; and
- a server as provided herein;

the sender user terminal being suitable for sending a message and access data to at least one multimedia content to the server, the message comprising metadata defining in association with said at least one multimedia content a challenge for presenting to said at least one destination user, and an expected response to the challenge, said server being suitable for relaying the metadata and said at least one multimedia content to said at least one terminal of said at least one destination user in order to present the challenge.

The system has the same advantages as those mentioned above for the terminals and the server provided herein.

One embodiment provided herein thus proposes a novel service enabling the use of a telecommunications network to be made entertaining, spontaneous, easy, and user friendly, and also a new way of communicating between users.

In other implementations or embodiments, it is also possible to envisage that the construction method, the processing method, the reception method, the terminals, the server, and the system present in combination some or all of the above-mentioned characteristics.

BRIEF DESCRIPTION OF THE DRAWINGS

Other characteristics and advantages of the present invention appear from the following description made with reference to the accompanying drawings, which show implementations having no limiting character. In the Figures.

Figure 6A:
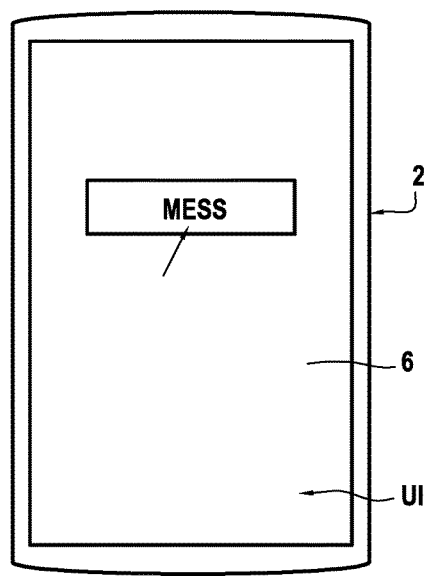
FIGS. 6A to 6H show examples of graphical user interface pages used for defining the metadata of a challenge and for enabling a message to be constructed in accordance with an exemplary embodiment.
Figure 6B:
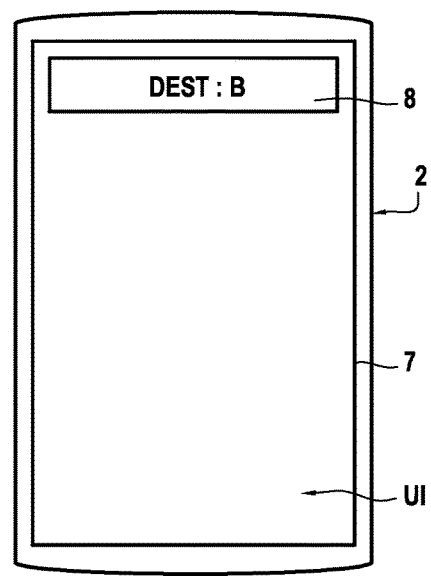
Figure 6C:
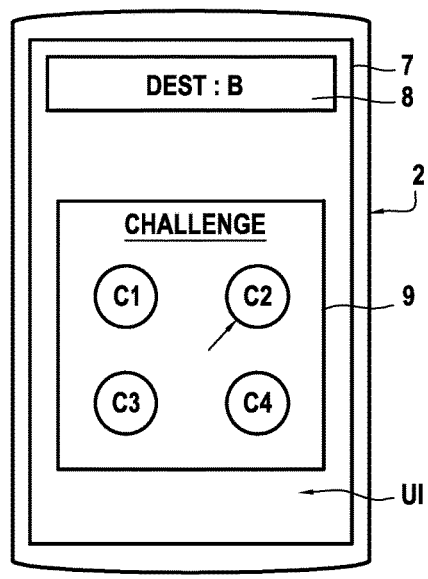
Figure 6D:
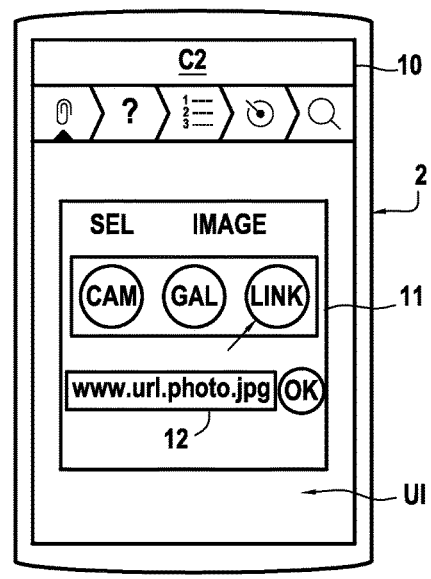
Figure 6E:
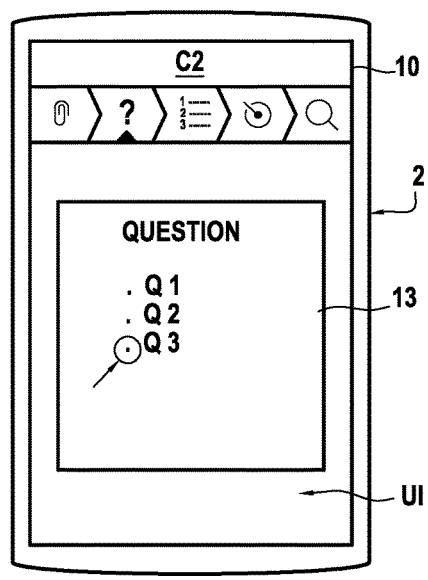
Figure 6F:
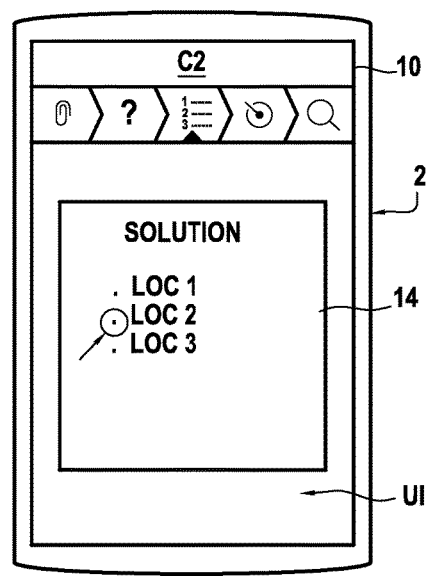
Figure 6G:
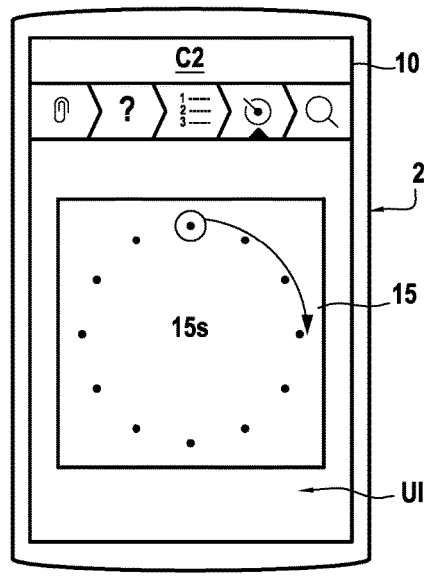
Figure 6H:
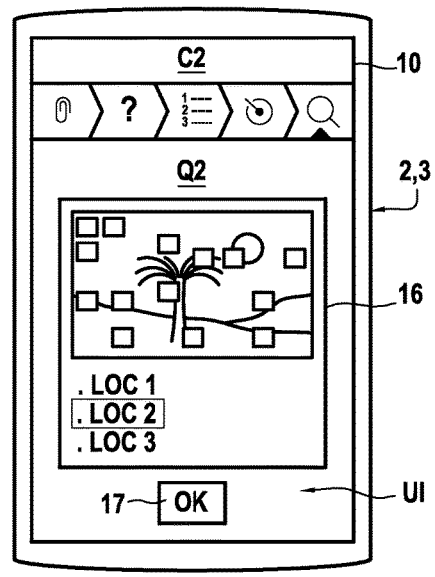
Figure 6I:
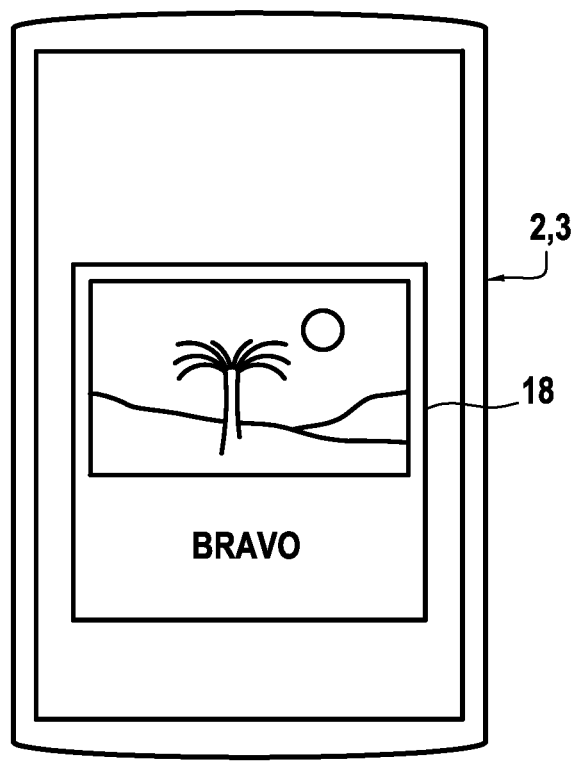

with FIGS. 6H and 6I showing examples of graphical user interface pages that may be presented to the destination user when presenting a challenge.

DETAILED DESCRIPTION OF THE PREFERRED EMBODIMENT

Figure 1:
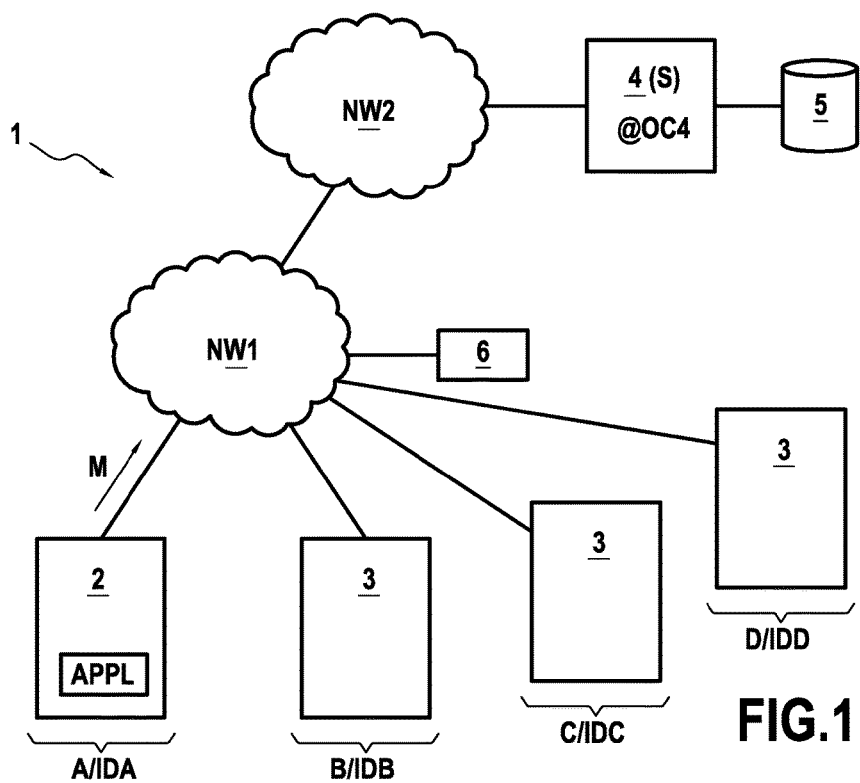
FIG. 1 is a diagrammatic view of a terminal, a server, and a system in accordance an exemplary embodiment.

FIG. 1 shows, in its environment, a system 1 in accordance with an exemplary embodiment.

The system offers a "game-playing" message exchange service S between a first user A having a terminal 2 in accordance with an exemplary embodiment (terminal of a sender user as provided herein), and a second user B having a terminal 3 (terminal of a destination user as provided herein), based on producing and presenting challenges accompanying multimedia contents. The term "multimedia content" is used to mean any type of digital content, and more particularly audio and/or video contents, and images.

For simplification in the description, consideration is given to an exchange of messages between only two users via their respective terminals. Nevertheless, some embodiments also make it possible to exchange messages between a number of users that is greater than two via their respective terminals 3.

No limitation is put on the natures of the terminals 2 and 3. In the example shown in FIG. 1, the terminals are smart phones, suitable for communicating over a mobile telecommunications network NW1, such as the third generation network (e.g. UMTS network) or a fourth generation network, for example. For this purpose, it is assumed that respective identifiers IDA and IDB have been allocated by the operator of the mobile telecommunications network NW1 to the users A and B respectively in order to communicate over the network NW1. The identifiers IDA and IDB in this example are constituted by telephone numbers.

In a variant, the terminals 2 and 3 may have other communications interfaces, such as for example a wireless fidelity (WiFi) type interface, or they may be suitable for communicating over distinct mobile telecommunications networks.

In the presently-described embodiment, the terminal 2 has a software application APPL that enables the user A to benefit from the service S, and more particularly to send and receive multimedia contents (e.g. a photograph, a text file, a text type message, audio and/or video files, etc.) accompanied by challenges that need to be solved in order to trigger playback of the multimedia contents. In other words, in the presently-described implementation, the destination user of such multimedia content cannot access that content in full without successfully solving the challenge associated therewith.

This challenge is produced (i.e. defined or constructed) by the user A with the help of a challenge definition module implemented by the application APPL, which in this example relies on a graphical user interface UI implemented by the application APPL and via which the user A can interact with the challenge definition module. This user interface UI provides the user with a tool for editing a message containing a challenge, which tool is both simple and easy to use. The challenge produced by the user A may for example be a quiz, a jigsaw puzzle to put together, a truncated audio file, or a hidden or partially masked image that is to be identified, a multiple choice question, etc. There is no limitation associated with the type of challenge that may be envisaged when implementing the embodiments described herein.

As mentioned above, the application APPL in this example also enables the user A to access multimedia contents sent by other terminals via the application APPL, in other words, contents that are accompanied by challenges to solve. It thus also implements a module for presenting a challenge defined in the context of the service S as provided herein.

In accordance with some embodiments, in order to implement the service S, the system 1 has not only the terminals 2 and 3, but also a server 4 for processing messages sent by the terminal 2 and in accordance with some embodiments.

The server 4 is in series in the paths followed by all of the messages sent by the terminal 2 and constructed by means of the application APPL. In this example, it is accessible via a public network NW2, typically the public Internet network. The contact address of the server 4 on this network NW2 (i.e. the address with which it can communicate and is accessible) is written @oC4, and it is configured in the application APPL.

In a variant, the address @oC4 is input in a list of contacts (directory) stored in the terminal 2 and accessible by the application APPL.

It is assumed in this example that the exchanges implemented between the application APPL installed in the terminal 2 and the server 4 comply with the HTTP protocol and with its secure version (HTTPs). Nevertheless, in a variant, other protocols could be envisaged.

Figure 2:
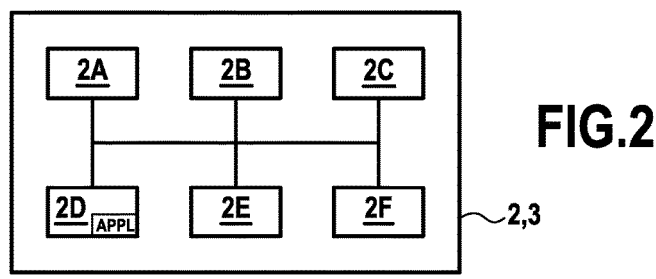
FIG. 2 shows the hardware architecture of the FIG. 1 terminal.

In the presently-described embodiment, the terminal 2 has the hardware architecture of a computer, as shown in FIG. 2. It comprises in particular a processor 2A, a ROM 2B, a random access memory (RAM) 2C, a non-volatile memory 2D, in this example storing the application APPL, communications means 2E for communicating over the mobile telecommunications network NW1 and enabling it in particular to communicate with the server 4, and input/output means 2F enabling it to interact with the user A. In this example, these input/output means comprise in particular a touch screen, a virtual keyboard, and means for playing back various multimedia contents, such as for example loudspeakers, a video player, etc. The graphical user interface UI implemented by the application APPL advantageously makes use of the input/output means 2F.

The ROM 2B of the terminal 2 constitutes a data medium that is readable by the processor 2A and that stores a computer program in accordance with the embodiments provided herein, including instructions for executing processes of a method as provided herein for constructing a message, the processes of the method being described below with reference to FIGS. 4, 5, and 6A to 6H in a particular implementation.

In equivalent manner, the computer program defines functional modules of the terminal 2 (software modules in this example) and more particularly of the software application APPL, such as a module for selecting a multimedia content and a destination for the message, a module for defining a challenge (relying in particular on the user interface UI and on the input/output means 2F of the terminal 2), and a module for sending the message to the server 4 via the network NW1 (relying in particular on the communications means 2E of the terminal 2). The functions of these various functional modules are described in greater detail with reference to the processes of the construction method.

The ROM 2B is also a data medium readable by the processor 2A and storing a computer program in accordance with the embodiments provided herein including instructions for executing processes of a method as provided herein for receiving a message, the processes of this message being described below with reference to FIGS. 4, 5, and 6A to 6I in a particular implementation.

This computer program defines in equivalent manner functional modules of the terminal 2 (in this example software modules) and more particularly of the software application APPL, such as a module for receiving a message and for downloading a multimedia content (relying in particular on the communications means 2E of the terminal 2), and a module for presenting a challenge (relying in particular on the user interface UI and on the input/output means 2F of the terminal 2). The functions of these various functional modules are described in greater detail with reference to the processes of the reception method.

Figure 3:
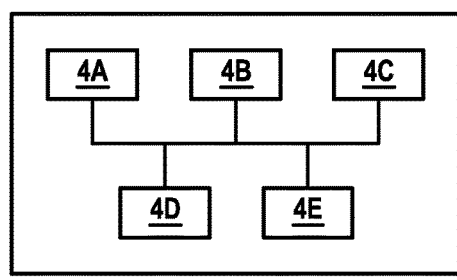
FIG. 3 shows the hardware architecture of the FIG. 1 server.

The terminal 3 has a hardware and functional architecture identical to that of the terminal 2. In similar manner, the server 4 in the presently-described embodiment also has the hardware architecture of a computer, as shown in FIG. 3. It comprises in particular a processor 4A, a hard disk (or a ROM) 4B, a RAM 4C, a non-volatile memory 4D, communications means 4E for communicating over the Internet public network NW2 and over the mobile telecommunications network NW1. The communications means 4E enable the server 4 to communicate in particular with the terminals 2 and 3 and also with other entities such as, for example a database 5A, that stores various kinds of information such as the users registered with the server 4 who have subscribed to the service S, their telephone numbers on the mobile telecommunications network NW1 (or on any other mobile telecommunications network), etc.

In this example, the non-volatile memory 4D is the data medium for a database containing metadata defining challenges for users registered with the server 4, and also a directory storing the multimedia contents associated with the challenges. The server 4 allocates a unique identifier to each multimedia content stored in the directory, which identifier is associated in the database with the corresponding challenge, i.e. with the challenge that is to be supplied to the destination user for the multimedia content. Each multimedia content stored in the directory is accessible via a URL address, in this example.

The hard disk 4B of the server 4 constitutes a data medium readable by the processor 4A and storing a computer program in accordance with the embodiments provided herein including instructions for executing processes of a method as provided herein for processing a message, the processes of this method being described below with reference to FIGS. 4, 5, and 6A to 6H in a particular implementation.

This computer program defines in equivalent manner functional modules of the server 4 (in this example software modules), such as a reception module for receiving a message constructed with the application APPL and containing a challenge and access data to access a multimedia content coming from the terminal 2, a module for verifying that the terminal of the destination user of the multimedia content has a challenge presentation module (e.g. the application APPL in this example) enabling it to read and process the metadata (in other words enabling it to propose the challenge defined by the metadata to the destination user), an invitation module for sending a message offering to install the challenge presentation module if the destination terminal does not already possess it, a storage module suitable for storing the multimedia content in the directory of the server 4 and the challenge metadata in the database of the server 4, and a send module for sending a message to the terminal of the destination user, which message includes the metadata and the address in the directory of the associated multimedia content (or the multimedia content itself). The reception, invitation, and send modules rely in particular on the communications means 4E of the server. The functions of these various functional modules are described in greater detail with reference to the processes of the processing method.

With reference to FIGS. 4, 5, and 6A to 6H, there follows a description of the main processes of an exemplary embodiment of the method of constructing a message, of the method of processing a message, and of the method of receiving a message in a particular implementation in which the methods are implemented respectively by the terminal 2, by the server 4, and by the terminal 3 of the user B in FIG. 1.

Figure 4:
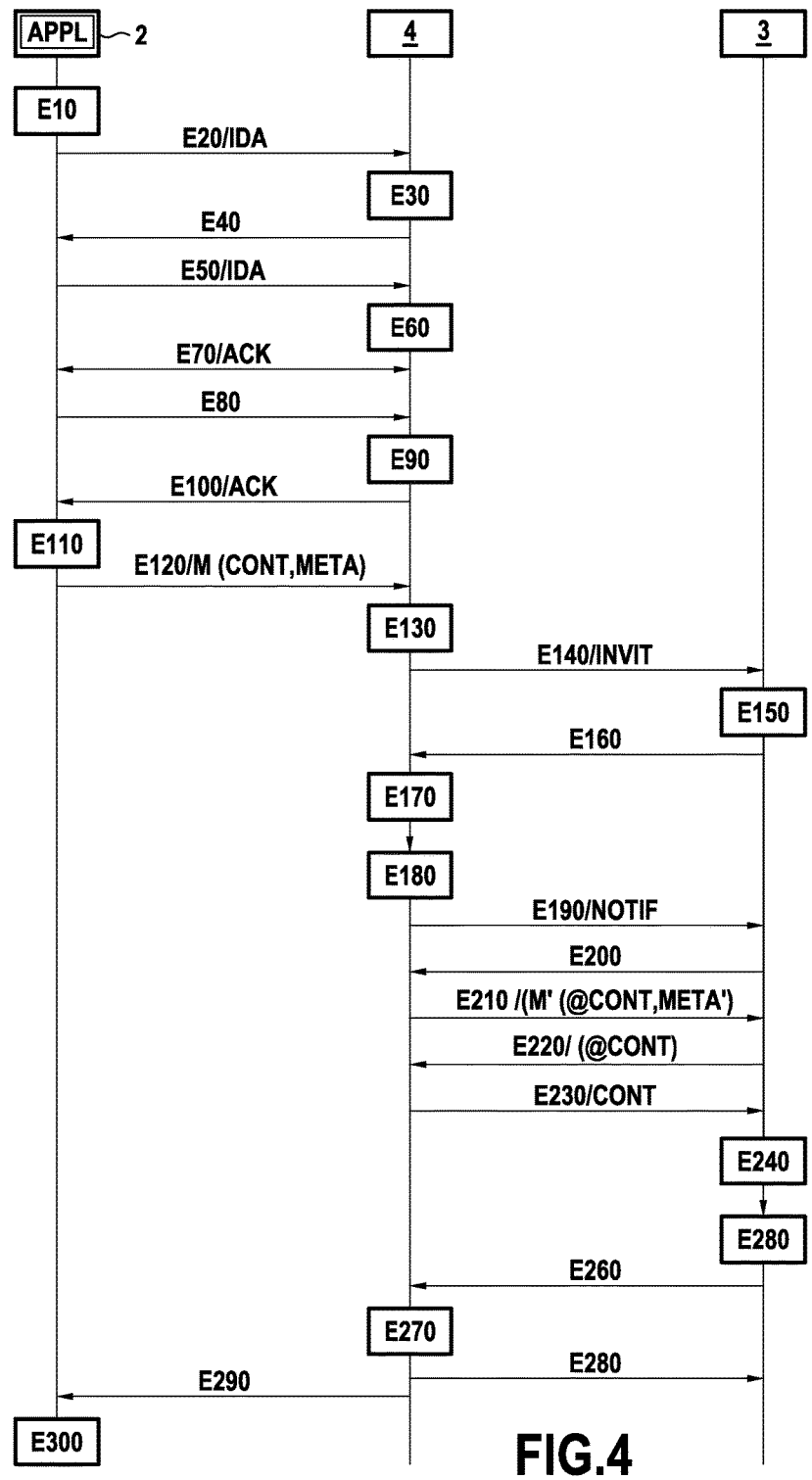
FIG. 4 shows the main processes of a method of constructing a message and a method of processing a message in accordance with an exemplary implementation in which the methods are implemented respectively by the terminal and by the server of FIG. 1.

With reference to FIG. 4, it is assumed that the user A (sender user) desires to share a multimedia content with the user B (destination user), and for this purpose decides to send a message constructed (i.e. composed) using the application APPL. For this purpose, user A launches the application APPL installed on the terminal 2, which connects with the server 4 at the reachability or contact address @oC4 that it already knows, as mentioned above (process E10). Launching the application APPL leads to a succession of user interface pages (or composition windows) being displayed that are used for constructing a message and for defining a challenge to be sent to the user B. In the description below, the terms user interface page, composition window, or merely window, are used interchangeably.

During the first connection of the application APPL to the server 4, the application APPL authenticates itself, and where necessary registers with the server 4 in order to enable the user A to be benefit from the service S.

More specifically, the application APPL installed on the terminal 2 sends an authentication request in compliance with the HTTP protocol to the server 4, which request contains the telephone number IDA of the user A on the mobile telecommunications network NW1 (process E20). This authentication request in this example is sent via the telecommunications network NW1 and transits to the server 4 via the Internet public network NW2.

On receiving the authentication request from the terminal 2, the server 4 interrogates the database 5 with the identifier IDA contained in the authentication request in order to verify whether the user A is registered and has subscribed to the service S (process E30).

If the identifier IDA is not associated in the database 5 with a user who has subscribed to the service S (i.e. in this example the user A is not registered with the server 4 as a user of a service or of a module for defining and/or presenting challenges), the server 4 asks the terminal 2 to subscribe (to register) with the service S (process E40). This request is displayed on a page of the user interface UI of the application APPL using the screen of the terminal 2.

The user A responds to this request by using the input/output means 2F of the terminal 2 to input the user's telephone number IDA on the network NW1 and name A. This information is transmitted by the terminal 2 via the application APPL to the server 4 in a subscription or registration request to the service S (process E50).

On receiving the subscription request from the terminal 2, the server 4 stores the telephone number IDA in association with the name A of the user A in the database 5 (process E60). The user A is thus registered with the server 4. An acknowledgment containing a code is sent by the server 4 to the terminal 2 so that the user A can input this code from a page of the interface UI of the application APPL; the code input by the user A is returned to the server 4 for verification and activation, where appropriate, of the service S (process E70). The user A can then benefit from the service S.

It should be observed that in the presently-described implementation, only users having the application APPL can subscribe to the service S and register with the server 4. In other words, in order to be able to register with the server 4 and subscribe to the service S, users must have a challenge definition module and/or a challenge presentation module suitable for being supplied with multimedia contents.

In the presently-described implementation, when the user A registers with the server 4, the application APPL also sends the list of contacts of the user A (i.e. the user A's directory) stored on the terminal 2, e.g. in the subscriber identity module (SIM) card or in another memory of the terminal, such as for example the non-volatile memory 2D (process E80). This list of contacts includes in particular a list of telephone numbers and/or identifiers on various fixed or mobile telecommunications networks serving to identify terminals, and also the names of the people (i.e. user identifiers) with which the numbers or identifiers are associated. In the presently-described example, the list includes in particular the telephone number of the user B on the network NW1 together with the user B's name (identifiers for identifying a terminal of the user B as provided herein).

This list of contacts is received by the server 4 and saved in the database 5 in association with the name of the user A (process E90). An acknowledgment is then sent to the terminal 2 (process E100).

Once the user A's registration and authentication have been achieved, the user A can construct (i.e. compose) a message M by using the pages of the user interface UI provided for this purpose by the application APPL (process E110). The graphical user interface UI enables the application APPL to interact with the user A in order to construct the message M.

Figure 5:
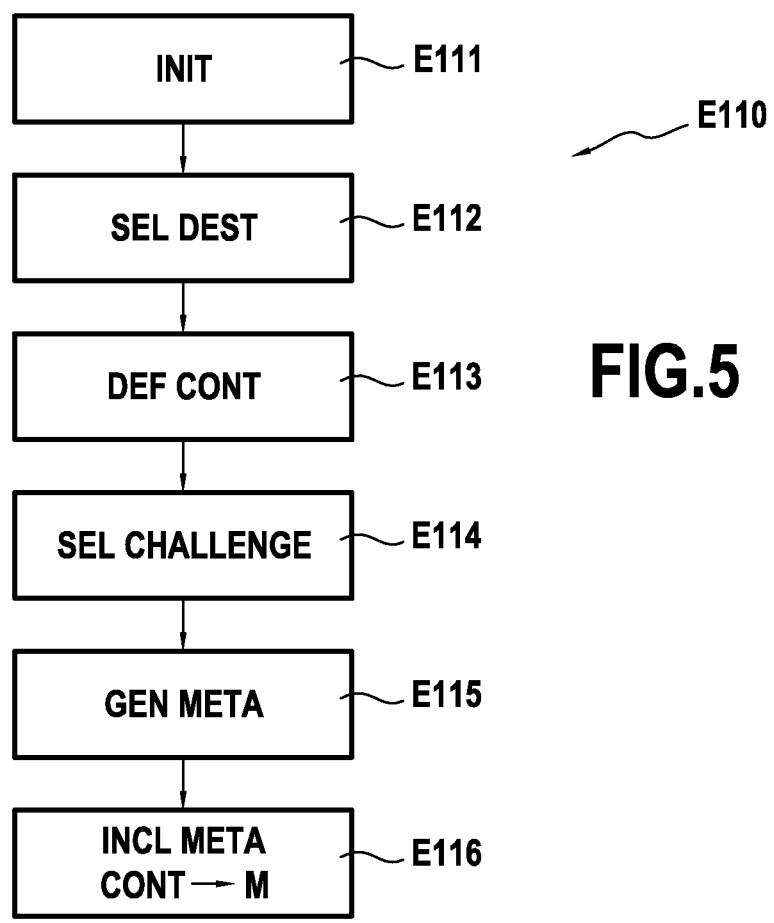
FIG. 5 shows the main processes of constructing a message as implemented by the terminal of FIG. 1 during the construction method of an exemplary embodiment.

The process of constructing the message is shown in detail in FIG. 5. By way of illustration, examples of pages of the graphical user interface UI for guiding the user A throughout this process of constructing the message A while interacting with the application APPL are shown in FIGS. 6A to 6H.

Thus, with reference to FIG. 6A, the user interface UI displays a welcome page 6 on the screen of the terminal 2 providing the user A with the possibility of composing a new message. The user A accesses this possibility by specifying the element "MESS" displayed on the welcome page, e.g. by pressing a finger on this element for a touch screen or by using a stylus provided for this purpose (process E111).

The user interface UI then opens a new user interface page on the screen of the terminal 2 having a window 7 for composing a new message, as shown in FIG. 6B. This window has a box 8 in which the user A is invited to input the destination user for the multimedia content that the user A seeks to share, in other words the destination user for the message. For this purpose, the user A may use the virtual keyboard of the terminal 2, or in the presently-described example, may select the destination user for the message from list of contacts (i.e. directory) stored in the mobile terminal 2.

It is assumed in this example that the user A specifies (i.e. selects) the user B as the destination user for the message from the list of contacts. This designation enables the application APPL to determine (i.e. obtain) the destination user for the message currently being constructed (process E112).

In a variant, a plurality of destination users may be designated for the message in similar manner by the user A.

After obtaining the destination user(s) for the message M, a succession of processes serves to define a challenge that is to be presented to the destination user(s), with this being implemented in accordance with the embodiments provided herein by the application APPL (and more precisely by the challenge definition module of the application APPL).

A new window 9 is thus initially displayed by the user interface UI on the screen of the terminal 2 proposing various categories of challenge (or indeed games) to the user A. In the example shown in FIG. 6C, four predetermined categories of challenge C1, C2, C3, and C4 are proposed to the user A in the display window 9. For example, C1 is a challenge category of the "blind test" type, C2 is a challenge category of the "mystery photographs" type, C3 is a challenge category of the "jigsaw puzzle" type, and C4 is a challenge category of the "quiz" type. These four challenge categories C1, C2, C3, and C4 constitute a catalog of predetermined challenges supplied by the application APPL via the interface UI to the user A in order to construct the message as provided herein. Naturally, these examples are given only by way of illustration and other types of challenge may be envisaged.

In this example it is assumed that the user A selects challenge category C2 on the touch screen of the terminal 2. In the presently-envisaged example, as a result of this selection, a new window is displayed by the user interface page so as to enable the user A to use the keyboard of the terminal 2 to input a covering message, if so desired, for the user B (e.g. "Have fun solving this new challenge", etc.) that is to accompany the challenge.

Thereafter, the graphical user interface UI of the application APPL installed on the terminal 2 uses a new user interface page 10 defining a message composition window, asking the user A to construct properly speaking the message. In this example, this construction process can be broken down into a plurality of subprocesses.

Firstly, the user A is invited by means of a window 11 opening in the composition window 10 to define, or more generally to select, one (or more) multimedia contents CONT for sending to the user B. The multimedia content may be of various kinds: it may be a photograph, an audio file, a text, a video file, etc., in other words any multimedia content produced by the user A (e.g. text input by the user A, a photograph taken by the user A), this content being already stored on the terminal 2 or on any other storage medium (e.g. on a remote server).

In the context of the challenge type C2 selected by the user A (i.e. "mystery photograph"), the multimedia content selected by the user A is a photograph. In this example, several options are offered, as shown in FIG. 6D, to the user A by the interface UI for selecting this photograph, i.e. and by way of example, the user A may decide to take a new photograph (by selecting the CAM tab), may select a photograph that is already stored in the terminal 2 (by selecting the GAL tab), or may provide a link to a photograph stored on a remote server (by selecting the LINK tab).

In this example, it is assumed that the user A selects the LINK tab. This selection is followed by the user interface UI displaying a window 12 for inputting the link giving access to the multimedia content (photograph) selected by the user A. The user A inputting the link www.url-photo.jpg into the input window 12 finishes off the application APPL obtaining an identification for the multimedia content that is to be transmitted to the user B (process E113).

Once the definition of the multimedia content is terminated, the user interface UI asks the user A to produce (i.e. construct) a challenge together with the response expected to the challenge, for use in conditioning access to the multimedia content (process E114). For this purpose, a new display window 13 is supplied by the user interface UI, which window lists several questions that can be associated with the photograph selected by the user A in the context of a "mystery photograph" challenge. In the example shown in FIG. 6E, three predetermined questions are displayed in the window 13, namely Q1="who's this?", Q2="what's this?", and Q3="where's this?". The questions Q1, Q2, and Q3 constitute a catalog of predetermined elements provided by the application APPL via the interface UI to the user A in order to construct the challenge.

In a variant, the user A may input these questions via the keyboard of the terminal 2.

In yet another variant, the questions may be predetermined and stored in the non-volatile memory 2D of the terminal. In more general manner, the user A may produce a challenge for the user B on the basis of previously prepared challenges stored in a non-volatile memory of the terminal, and the user is then invited to personalize them using the editor tool and the interface pages (composition window) made available by the user interface UI.

It is assumed in this example that the user A selects question Q3.

Once this selection has been made, the user interface UI presents a display window 14 to the user A on the screen of the terminal 2 so as to enable the user to input multiple responses that are to be presented to the user B, which responses include the expected response to the challenge, i.e. to the question Q3. In the example shown in FIG. 6F, the user A uses the virtual keyboard of the terminal 2 to input three possible responses, namely LOC1="a desert island", LOC2="the Arizona desert", LOC3="my garden". The user also specifies the expected response to the challenge, specifically the response LOC2.

In the presently-described implementation, the user A can also use the graphical user interface UI to set a maximum duration in which the expected response should be given to the challenge. This duration may be input by the user using the keyboard of the terminal 2, or as shown in FIG. 6G by sliding a finger over a clock displayed on the display window 15 provided for this purpose by the user interface so as to specify the desired time (e.g. 15 minutes in the example shown).

Setting this maximum duration completes producing both the challenge and also the expected response to the challenge.

It should be observed that the expected response to the challenge may depend implicitly on the nature of the challenge selected by the user. Thus, when the challenge is a jigsaw puzzle, the expected response to the challenge is a correct reconstruction of the jigsaw puzzle.

The various interactions described between the user and the user interface UI involved in defining a challenge to present to the user B and an expected response to the challenge are converted by the challenge definition module of the application APPL into metadata META (process E115). As provided herein, the metadata META comprise metadata defining relative to the multimedia content CONT selected by the user A the challenge and the expected response to the challenge as constructed by the user A via the interface UI.

The metadata META is alphanumeric data (i.e. text) describing, either explicitly or in coded manner, the challenge and the response expected to the challenge as defined by the user A via the user interface UI.

More precisely, in this example, it defines specifically the type (category) of the challenge selected by the user A, the parameters of the challenge (e.g. the elements making up the challenge, i.e. the question put and the expected response to the challenge), at least one operation to be executed by the challenge presentation module depending on whether the response given by the destination user is or is not the expected response, the maximum time allowed for providing a response to the challenge, etc.

In the context of a challenge of the quiz type (category C4), relying on playing back multimedia content in part, information representative of the nature of the multimedia content CONT may also be included in the metadata so as to enable the challenge presentation module installed on the terminal of the destination user B (in this example the application APPL) to select the appropriate multimedia content playback module on reading the metadata.

In this example, the metadata is in the form of a list of identifiers or of information field names, together with a respective value associated with each listed information field. For example, an alphanumeric code on one or two bytes may be used to code each of the information fields and the values associated with the fields. By way of example, these information fields may be:

- a status field (e.g. "status": "200");
- a challenge type identifier (e.g. "gameType": "2"), associated with the category of the challenge selected by the user A;
- an identifier of the destination user or of a terminal of the destination user (e.g. "contactPhoneNum": "33630350911");
- a game creation date ("creationDate": "2014 Mar. 4 10:33:26");
- the number of pieces of a jigsaw puzzle when a jigsaw puzzle type challenge is selected by the user (e.g. "pieceNum": "1") and/or the positions of the pieces of the puzzle (expected response to the challenge);
- a maximum duration for providing a response to the challenge, e.g. defined in seconds (e.g. "timer", "9");
- an identifier of the response expected to the challenge (e.g. "idChoice": "0");
- a media type identifier, i.e. specifying the nature of the multimedia content selected by the user when the challenge is of the quiz type (e.g. "MediaType"); and
- text to be presented on presenting the challenge (e.g. question posed in the challenge); etc.

In the presently-described implementation, the challenge definition module and the challenge presentation module are implemented by the application APPL such that the metadata used by either one of them is comprehensible to and may be interpreted by the other. In general, it is ensured that the metadata used for defining the challenge and the expected response to the challenge comply with coding logic that is common to the challenge definition module installed in the terminal 2 of the user A and to the challenge presentation module installed in the terminal 3 of the user B.

The metadata META combines all of the information needed to present the challenge defined by the user A by the challenge presentation module of the application APPL, if any, that is installed on the terminal of the user B.

In the presently-described implementation, at the end of the process of producing the challenge and its response, the challenge definition module of the application APPL uses the user interface UI to offer an overview of the challenge that has just been produced and that is to be presented to the user B. FIG. 6H shows the challenge corresponding to the choices made by the user as shown in FIGS. 6A to 6G, in other words a mystery photograph (i.e. a photograph that is partially masked) to which access is conditioned by a multiple choice question. The masking elements of the mystery photograph are defined in random manner by a predefined algorithm implemented by the challenge definition module. The challenge as produced in this way is shown in a display window 16 of the user interface UI.

If the user A is satisfied, the challenge that has been produced can be validated by pressing on the OK button 17.

Naturally, the presently-described implementation shown in FIGS. 6A to 6H is given purely by way of illustration. No limitation is associated with the type of challenge that can be used by the user A for accompanying the multimedia content that is to be transmitted to the user B, nor with the response elements, nor even with the type of multimedia content. At each process of constructing (producing) the challenge by the application APPL using its interactions with the user A, elements (challenges, responses, questions, etc.) other than those envisaged in this example may be proposed to the user A for constructing the challenge by means of the graphical interface UI. It should also be observed that the elements proposed to the user A for producing the challenge to be sent to the user B may be conditioned by other parameters and may, for example, be adapted to the user A, and/or to the destination user B of the message, etc., as described in detail below.

On receiving validation from the user A, the challenge definition module of the application APPL inserts, into a message M (process E116), the metadata META defining the challenge in association with the multimedia content CONT, the response expected to the challenge, the maximum duration for responding to the challenge, and the name or some other identifier suitable for identifying a terminal of the destination user B (e.g. a telephone number present in the list of contacts or input by the user A).

In the presently-described implementation, the message M is an HTTP request of the POST type sent to the server 4. The challenge definition module also inserts at this point into the message M the multimedia content CONT as selected by the user A, if that content is stored on the terminal 2 so that it can be transmitted simultaneously with the metadata. It is appropriate to observe that the multimedia content may be inserted, where appropriate, in binary mode in the POST request.

More generally, in the presently-described implementation, the challenge definition module inserts data giving access to the multimedia content CONT into the message M (by way of example, a URL selected by the user A in process E113). The term "access data" is used herein to mean either the multimedia content itself, or else data such as for example a URL address giving access to the multimedia content on a local entity or a remote entity.

In another implementation, the message M is an HTTP request of the GET type having the metadata inserted therein. The multimedia content or more generally the data giving access to the multimedia content is sent to the server 4 in an HTTP request of the POST type after the server has sent an identifier to the terminal 2 enabling the server to associate the metadata with the multimedia content transmitted by the terminal 2, which metadata is passed by the terminal 2 as a parameter in the HTTP POST request used for sending the multimedia content or the data giving access to the content.

In yet another implementation, the metadata and/or the access data to the multimedia content may be sent in messages complying with other types of format, such as for example an SMS or MMS message, etc.

This brings to an end the process E110 of constructing the message M by the challenge definition module of the application APPL installed on the terminal 2 as a result of interaction with the user A using pages of the graphical interface UI.

The message M is then sent by the application APPL to the server 4, via the telecommunications network NW1, making use of the contact address @oC4 configured in the application APPL (process E120).

The server 4 extracts the identifier (e.g. the name) of the destination user B from the message M. It uses this identifier to interrogate the database 5 (process E130) in order to verify whether the user B is registered and has subscribed to the service S.

If the user B is registered, that means that the user B's terminal has a module for presenting a challenge sent in the context of the service S (i.e. in this example the application APPL). It is assumed at this point that the user B is not registered in the database 5, i.e. that the user B has not taken out a subscription to the service S with the server 4, and therefore does not have a module for presenting a challenge sent in the context of the service S (suitable in particular for interpreting the metadata contained in the message M).

Under such circumstances, the server 4 stores the message M in its volatile memory 4D.

Then, from the name of the destination user B included in the message M and from the list of contacts of the user A stored in the database 5, it determines the telephone number of the user B on the mobile telecommunications network NW1. Thereafter, using the telephone number as determined in this way, it sends a message INVIT to the terminal 3 inviting it to install the application APPL and to subscribe to the service S (process E140) with the server 4. The message INVIT is an invitation message to download the application APPL from a link (e.g. a URL specified in the message).

In the presently-described implementation, the invitation message INVIT is sent by the server 4 to the terminal 3 via a server SMS 6 that is suitable for handling the sending and receiving of SMS messages over the mobile telecommunications network NW1.

In a variant implementation, the telephone number of the destination user B of the message M is provided in the message M by the application APPL using the list of contacts stored in the terminal 2.

In another implementation, the server 4 identifies the contacts of the user A that are not stored in the database 5 and that have not taken out subscriptions to the service S (and are therefore not provided with the application APPL) on transmission during process E80 of the list of contacts of the user A to the server 4 by the terminal 2. The same applies to sending the invitation message to download the application APPL to unregistered contacts as identified in this way.

On receiving the invitation message INVIT, the user B downloads the application APPL in a memory of the terminal 3 from the URL specified in the message INVIT (process E150). Once installed, the application APPL of the terminal 3 sends a message to the server 4 informing it that installation has succeeded and it proceeds to register the user B (process E160). This registration is performed as described above for the user A (cf. processes E10 to E100).

At the end of this registration, the server 4 has stored in the database 5 the name of the user B in association with the user B's telephone number on the network NW1 and contacts list (process E170).

If the user B does not install the application APPL on the terminal 3 after being invited to do so by the server 4, then the server 4 deletes the message M after a predetermined time delay following the sending of the invitation message INVIT. A message may also be sent to the terminal 2 of the user A in order to inform the user A that the user(s) to whom the user A sought to send the multimedia content has/have not executed the challenge accompanying the multimedia content and has/have not had access to that content (possibly not wishing to join the service S or to install the application APPL).

After the user B has registered with the server 4, the server 4 extracts the multimedia content CONT, or where appropriate the data for accessing the multimedia content, from the message M, gives it a unique identifier ID-CONT, and stores the content CONT in a directory of its non-volatile memory (storage space of the server as provided herein) (process E180). This storage process optionally includes obtaining (e.g. downloading) the content CONT on the basis of the access data specified in the message M.

It is assumed that the multimedia content CONT is kept accessible in this directory via an address of the type URL @CONT (second access data as provided herein).

The server 4 also extracts the metadata META contained in the message M and stores it in association with the unique identifier ID-CONT given to the multimedia content CONT and the identifier IDB of the destination user B, in a database of its non-volatile memory (process E180).

Thereafter, in the presently-described implementation, the server 4 sends a notification to the terminal 3 of the user B seeking to inform the user B that a challenge is available for that user on the server 4 (process E190).

It is assumed at this point that on receiving the notification, the user B decides to access the challenge. The application APPL installed on the terminal 3 sends a request for this purpose to the server 4 (process E200).

On receiving this request, the server 4 sends a message M' to the terminal 3 including the metadata META stored in its database possibly together with other metadata (thus forming metadata META'), and also the address @CONT giving access to the multimedia content CONT stored in the directory of the server. The address @CONT may be inserted in the metadata META'.

In another implementation, the message M' includes the multimedia content CONT.

In this implementation, the message M' is a request in compliance with the JavaScript Object Notation (JSON) format, which in known manner is a generic format for text data derived from the object notation of the JavaScript language.

In a variant, other message formats may naturally be envisaged.

The server then sends the message M' via the network NW1 to the terminal 3 (process E210).

On receiving the message M', the application APPL of the terminal 3 extracts the metadata META' included in the message M' and downloads the multimedia content CONT from the address URL @CONT specified in the metadata META' (processes E220/E230).

The multimedia content CONT is stored by the application APPL in the non-volatile memory of the terminal 3.

Thereafter, the challenge presentation module of the application APPL analyzes and interprets the metadata META' contained in the message M' in order to present (i.e. execute) the challenge defined by the user A to the user B on the terminal 3.

More specifically, when presenting the challenge, the challenge presentation module presents a succession of user interface pages (i.e. pages of the interface UI of the application APPL in the presently-described implementation).

The presentation of one of these user interface pages used for presenting the challenge is preferably predefined from a user interface model or "template". The arrangement and the size of the elements (e.g. text making up the challenge properly speaking, the truncated or masked multimedia content, etc.) appearing on each page and also the succession of other pages are predefined for a given type of challenge, such that only the element that is to be presented at the location selected for that element on a page needs to be specified in order to enable the challenge to be presented by the challenge presentation module to the user B in a form that is understandable and usable. This element is identified using the coding common to the coding used in the metadata META defining the challenge. In other words, each element that is to be presented on each user interface page during the presentation of the challenge is extracted by the challenge presentation module from the metadata META.

On receiving the metadata META', the template(s) for the user interface pages associated with the type of game identified by the metadata is/are thus used by the challenge presentation module of the application APPL, being modified on the basis of the metadata META' so as to generate one or more user interface pages for presenting to the user B the challenge to which the user is to respond by means of the terminal 3 (process E240).

FIG. 6H shows an example of a user interface page that may be presented by the challenge presentation module of the application APPL to the user B on presenting the challenge by means of the graphical interface UI.

In this implementation, the challenge is constituted by a masked photograph associated with the question Q2 and three possible responses LOC1, LOC2, and LOC3, the expected response defined in the metadata META' being the response LOC2. The masked photograph is generated by the challenge presentation module on the basis of the multimedia content CONT in application of the same masking algorithm as that implemented by the challenge definition module.

If the user B does not use the terminal 3 to provide a response to the challenge or if the user B provides a response that is different from the expected response contained in the metadata META', the challenge presentation module of the application APPL refuses to play back the multimedia content CONT in full to the user B (i.e. refuses to display it) and it deletes the multimedia content CONT stored in the non-volatile memory of the terminal 3. It may also display a user interface page informing the user B that the user B has failed to provide a correct response to the challenge from the user A.

In contrast, if the user B uses the terminal 3 to provide the expected response to the challenge (in this example LOC2), the challenge presentation module of the application APPL reproduces the multimedia content CONT as selected by the user A in a user interface page on the screen of the terminal 3 (process E250), e.g. as shown in FIG. 6I.

In the presently-described implementation, the challenge presentation module of the application APPL installed on the terminal 3 is configured so as to send a report message to the server 4 informing it of the failure or on the contrary the success of the user B in providing the expected response to the challenge (process E260).

In a variant implementation, depending on the challenge sent to the user B by the user A, the message may also contain a score obtained by the user B on providing a response to the challenge.

On receiving the report message from the terminal 3, the server 4 updates a score given to the user B and stored in the database 5. This score is updated each time a challenge is sent to the user B (process E270). By way of example, it is incremented each time the user B successfully responds to the challenge proposed by the user A. In the presently-described implementation, this score makes it possible to classify users registered with the server 4 that have subscribed to the service S, or in a variant to classify the users present in the list of contacts of the user A.

This classification is sent to the user B by the server 4 to the terminal 3 (process E280). It should be observed that the classification or current score of the user B maintained by the server 4 may also be transmitted in the metadata META' when the server 4 has a new challenge for the user B.

As a variant, or in addition, it may also be sent to the terminal 2 of the user A.

In a variant implementation, if the failure of the user B to provide the expected response to the challenge is signaled to the server 4 by the terminal 3, then, with the agreement of the user A, the server 4 can unlock the presentation of the multimedia content CONT to the user B on the terminal 3.

In another variant implementation, such unblocking is followed by decrementing the score of the user B as maintained by the server 4.

In yet another variant implementation, a score is also maintained in the server 4 for the user A as a producer of challenges: each challenge produced by the user A results in an increment of the user A's score.

In the presently-described implementation, depending on the score obtained by the user B (either in response to a particular challenge or else to all of the challenges in which the user B has participated, or a predetermined selection of them), the server 4 also sends a message to the application APPL installed on the terminal 2 so that the catalog of elements proposed to the user A for producing challenges for the attention of the user B is updated (process E290). This updating (process E300) may for example comprise unblocking new elements (e.g. new challenges or new categories of challenge, or elements enabling the challenges proposed to the user B to be made more complex, etc.). The catalog of elements proposed to the user A is thus advantageously adapted to the user B. A similar adaptation is performed on the terminal 3.

It should be observed that the service S for exchanging "game-playing" messages as described above may be used independently or it may be incorporated in some other service, such as in a communication suite such as RCS or "Joyn®", or indeed in an on-line social network such as "Facebook®". Under such circumstances, the graphical user interface of the challenge definition module and of the challenge presentation module as implemented by the application APPL may also be incorporated in the graphical interface of the enriched communication suite or of the on-line social network, and the messages M, INVIT, and M' exchanged between the various entities of the system 1 may be in a message format that is accepted by the enriched communication suite or by the on-line social network.

What is claimed is:

1. A method for constructing a message by a terminal of a sender user, the method comprising:
   obtaining, via a graphical user interface, a selection by the sender user of a multimedia content and of a destination user distinct from the sender user;
   constructing a message, by a challenge definition module of the terminal, on the basis of interaction with the sender user wherein constructing the message comprises:
      producing metadata defining, in association with said at least one multimedia content, a challenge for presenting to the destination user and an expected response to the challenge, said metadata containing information required for presenting said challenge on a terminal of the destination user; and
      inserting the metadata and an identifier of the terminal of the destination user in the message; and
   sending using a telecommunications network the message and data giving access to the multimedia content to a server configured to relay said metadata and the multimedia content to the terminal of the destination user.

2. A method according to claim 1, wherein the metadata comprises:
   a type of the challenge; and
   parameters of the challenge to be presented.

3. A method according to claim 1, wherein the metadata is configured to identify at least one operation to be executed after presenting the challenge on the terminal of the destination user, depending on whether a response provided by the destination user corresponds to said expected response.

4. A method according to claim 1, wherein the metadata include a maximum duration for providing a response to the challenge after said challenge has been presented to the destination user.

5. A method according to claim 1, wherein the challenge is selected by the sender user from a catalog of predetermined challenges, the catalog being adapted to the destination user of the message.

6. A method according to claim 5, wherein the catalog of predetermined challenges is updated with at least one new challenge selected for the destination user after receiving a message from the server.

7. A method according to claim 1, further comprising registering the sender user with the server as a user of a challenge definition module and/or a challenge presentation module.

8. A processing method for implementation by a server, the method comprising:
   receiving via a telecommunications network a first message and first access data to a multimedia content from a first terminal of a sender user, said first message comprising an identifier of a second terminal of a destination user and metadata defining, in association with the multimedia content, a challenge for presenting to the destination user and an expected response to the challenge, the first message being constructed on the basis of interaction with the sender user via a graphical user interface, including selection of the multimedia content and the destination user;
   storing the multimedia content in a storage space of the server; and
   sending a second message to the second terminal of the destination user, the second message comprising the metadata and second access data to the multimedia content stored on the server.

9. A processing method according to claim 8, comprising:
   verifying that the second terminal of the destination user is provided with a challenge presentation module suitable for presenting the challenge defined by the metadata to the destination user;
   and if the second terminal of the destination user is not provided with the challenge presentation module, sending an invitation message to the second terminal to install the challenge presentation module; and
   sending the second message comprising the metadata to the second terminal after the definition presentation module has been installed thereon.

10. A processing method according to claim 8, comprising, after sending the second message, receiving a third message from the second terminal of the destination user, said third message reporting success or failure of said destination user in providing the expected response to the challenge when the challenge is presented by the second terminal.

11. A processing method according to claim 10, including updating a score associated with the destination user as a function of the failure or success reported in the third message received from the second terminal of the destination user.

12. A processing method according to claim 11, further including, after updating the score:
   classifying the destination user as a function of the score associated with the destination user relative to scores of a plurality of users registered with the server; and
   sending the classification to the second terminal of the destination user and/or to the first terminal of the sender user.

13. A method of receiving a message, comprising:
receiving, by a terminal of a destination user from a server via a telecommunications network, the message comprising access data to a multimedia content and metadata defining, in association with the multimedia content, a challenge for presenting to the destination user and an expected response to the challenge, the message constructed by a terminal of a sender user distinct from the destination user on the basis of interaction with the sender user via a graphical user interface, including selection of the multimedia content and the destination user;
downloading the multimedia content on the basis of said access data; and
presenting, by a challenge presentation module of the terminal of the destination user, the challenge defined by the metadata, said presenting comprising:
presenting at least one user interface page with the challenge to the destination user;
obtaining a response to the challenge from the destination user;
verifying whether the response obtained from the destination user matches the expected response to the challenge as defined in the metadata; and
executing at least one predetermined operation depending on whether the response obtained from the destination user corresponds to the expected response to the challenge.

14. A reception method according to claim 13, wherein said at least one predetermined operation comprises:
displaying another user interface page; or
playing back the multimedia content.

15. A computer having stored thereon instructions, which, when executed by the computer, cause the computer to perform the method according to claim 1.

16. A non-transitory computer readable data medium storing a computer program including instructions for executing the method according to claim 1.

17. A terminal comprising:
a processor; and
a memory storing instructions that, when executed by the processor, cause the processor to:
obtain, via a graphical user interface, a selection by a sender user of a multimedia content and a destination user distinct from the sender user;
construct a message on the basis of interaction with the sender user;
produce metadata defining, in association with the multimedia content, a challenge for presenting to the destination user and an expected response to the challenge, said metadata containing information required for presenting the challenge on a terminal of the destination user;
insert in the message the metadata and an identifier of the terminal of the destination user; and
send the message and access data to the multimedia content via a telecommunications network to a server configured to relay the metadata and the multimedia content to the terminal of the destination user.

18. A server comprising:
a processor; and
a memory storing instructions that, when executed by the processor, cause the processor to:
receive via a telecommunications network from a first terminal of a sender user:
first access data to a multimedia content; and
a first message comprising an identifier of a second terminal of a destination user of the multimedia content and metadata produced by the first terminal of the sender user, said metadata defining, in association with the multimedia content, a challenge to be presented to the destination user and an expected response to the challenge, and containing information required for presenting the challenge on the second terminal of the destination user, the first message being constructed on the basis interaction with the sender user by the first terminal via a graphical user interface, including selection of the multimedia content and the destination user;
store the multimedia content in a storage space of the server; and
send to the second terminal of the destination user a second message comprising the metadata and second access data to the multimedia content stored on the server.

19. A terminal associated with a destination user, the terminal comprising:
a processor; and
a memory storing instructions that, when executed by the processor, cause the processor to:
receive a message from a server via a telecommunications network, said message comprising access data to a multimedia content on the server and metadata defining, in association with the multimedia content, a challenge for presenting to the destination user and an expected response to the challenge, and containing information required for presenting the challenge on said terminal, the message produced by a terminal of a sender user distinct from the destination user on the basis of interaction with the sender user via a graphical user interface, including selection of the multimedia content and the destination user;
download the multimedia content based on said access data; and
to process the metadata in order to:
present at least one user interface page with the challenge to the destination user;
obtain a response to the challenge from the destination user;
verify whether the response obtained from the destination user matches the expected response to the challenge as defined in the metadata; and
execute at least one predetermined operation depending on whether the response obtained from the destination user corresponds to the expected response to the challenge.

20. A computer having stored thereon instructions, which, when executed by the computer, cause the computer to perform the method according to claim 8.

21. A computer having stored thereon instructions, which, when executed by the computer, cause the computer to perform the method according to claim 13.

22. A non-transitory computer readable data medium storing a computer program including instructions for executing the method according to claim 8.

23. A non-transitory computer readable data medium storing a computer program including instructions for executing the method according to claim 13.

* * * * *